(12) United States Patent
Antons et al.

(10) Patent No.: US 10,310,849 B2
(45) Date of Patent: Jun. 4, 2019

(54) VISUAL PRESENTATION OF METRICS REFLECTING LIFECYCLE EVENTS OF SOFTWARE ARTIFACTS

(71) Applicant: Teachers Insurance and Annuity Association of America, New York, NY (US)

(72) Inventors: Stanislav Antons, Barrington, RI (US); Thomas Steven Joyce, Washington, DC (US); William V. Arneth, III, Westborough, MA (US); LeeAnn Marie Flanagan, Medway, MA (US); Weston John Gaddis, Lexington, NC (US); Thomas Fredrick Krall, Hanover, MA (US); Jennifer D'awn Jeffress, Bailey, CO (US); Christopher Joseph Heidenfelder, Weston, WI (US); Elizabeth Anne MacDonald, Schenectady, NY (US); Nathaniel Bates, Portsmouth, NH (US); Gary R. Couture, Hollis, NH (US); Scott M. Blandford, Hopewell, NJ (US); Thomas J. Goodnough, Shrewsbury, MA (US); Byron Leslie Griffin, Huntersville, NC (US); Andrea J. Vient, Stow, MA (US)

(73) Assignee: Teachers Insurance and Annuity Association of America, New York, NY (US)

( * ) Notice: Subject to any disclaimer, the term of this patent is extended or adjusted under 35 U.S.C. 154(b) by 53 days.

(21) Appl. No.: 14/951,072

(22) Filed: Nov. 24, 2015

(65) Prior Publication Data

US 2017/0147334 A1 May 25, 2017

(51) Int. Cl.
*G06F 8/71* (2018.01)
*G06F 8/77* (2018.01)
(Continued)

(52) U.S. Cl.
CPC .................. *G06F 8/71* (2013.01); *G06F 8/77* (2013.01); *G06F 11/3476* (2013.01); *G06Q 10/06* (2013.01); *G06Q 10/00* (2013.01)

(58) Field of Classification Search
CPC .. G06F 8/70–8/71; G06F 8/77; G06F 3/0484; G06F 11/34–11/3466; G06F 11/3476; G06F 11/3604; G06F 11/3616
(Continued)

(56) References Cited

U.S. PATENT DOCUMENTS 5,696,701 A * 12/1997 Burgess ................ G06F 11/348
702/186
6,536,036 B1 3/2003 Pavela
(Continued)

OTHER PUBLICATIONS

Johnson, P. M., et al., Automated Recognition of Test-Driven Development with Zorro, Agile Conference (AGILE), 2007, 10 pages, [retrieved on Jun. 8, 2017], Retrieved from the Internet: <URL:http://ieeexplore.ieee.org/>.*
(Continued)

*Primary Examiner* — Geoffrey R St Leger
(74) *Attorney, Agent, or Firm* — Lowenstein Sandler LLP (57) ABSTRACT

Systems and methods for visual presentation of metrics reflecting lifecycle events of software artifacts. An example method may comprise: receiving one or more data processing rules, each data processing rule specifying one or more operations to be performed on one or more raw data items reflecting lifecycle events associated with a software artifact; receiving, from one or more data collection agents, a plurality of raw data items; producing, by applying the data processing rules to the plurality of raw data items, a plurality
(Continued)

of values of a metric reflecting lifecycle events associated with a plurality of software artifacts; and causing the values to be graphically represented using a graphical user interface (GUI) communicatively coupled to the processor.

20 Claims, 6 Drawing Sheets

(51) Int. Cl.
*G06F 11/34* (2006.01)
*G06Q 10/00* (2012.01)
*G06Q 10/06* (2012.01)

(58) Field of Classification Search
USPC .................................. 717/101–103, 120–121
See application file for complete search history.

(56) References Cited

U.S. PATENT DOCUMENTS

| | | | |
|---|---|---|---|
| 6,546,506 B1 | 4/2003 | Lewis | |
| 7,873,944 B2 | 1/2011 | Bangel et al. | |
| 7,921,026 B2 | 4/2011 | O'Cull et al. | |
| 8,146,100 B2* | 3/2012 | Kilian-Kehr | G06F 9/542 709/204 |
| 8,589,203 B1 | 11/2013 | Collins et al. | |
| 8,612,572 B2* | 12/2013 | Hayes | G06N 5/025 709/203 |
| 8,875,088 B1 | 10/2014 | Holler et al. | |
| 8,881,095 B1 | 11/2014 | Hunt, Jr. et al. | |
| 9,110,496 B1 | 8/2015 | Michelsen | |
| 2002/0019945 A1* | 2/2002 | Houston | H04L 41/0604 726/23 |
| 2003/0137541 A1 | 7/2003 | Massengale et al. | |
| 2004/0114518 A1* | 6/2004 | MacFaden | H04L 41/0816 370/230.1 |
| 2005/0039163 A1 | 2/2005 | Barrett et al. | |
| 2005/0114830 A1 | 5/2005 | Knutson et al. | |
| 2005/0278208 A1 | 12/2005 | Schultz | |
| 2006/0101378 A1 | 5/2006 | Kennedy et al. | |
| 2006/0224740 A1* | 10/2006 | Sievers-Tostes | G06F 9/5038 709/226 |
| 2007/0118491 A1* | 5/2007 | Baum | G06F 17/30619 706/20 |
| 2007/0203775 A1 | 8/2007 | Busch et al. | |
| 2007/0226546 A1 | 9/2007 | Asthana et al. | |
| 2007/0226755 A1* | 9/2007 | Kilian-Kehr | G06F 8/71 719/318 |
| 2007/0233534 A1 | 10/2007 | Martin et al. | |
| 2008/0010543 A1 | 1/2008 | Yamamoto et al. | |
| 2008/0016490 A1 | 1/2008 | Pabalate et al. | |
| 2008/0082956 A1 | 4/2008 | Gura et al. | |
| 2008/0092120 A1 | 4/2008 | Udupa et al. | |
| 2008/0221946 A1 | 9/2008 | Balon | |
| 2008/0282235 A1 | 11/2008 | Jadhav et al. | |
| 2009/0171893 A1 | 7/2009 | Gonzales, II et al. | |
| 2009/0299940 A1* | 12/2009 | Hayes | G06N 5/025 706/47 |
| 2010/0017246 A1 | 1/2010 | Farrell et al. | |
| 2010/0017738 A1 | 1/2010 | Rhodes et al. | |
| 2010/0179508 A1 | 7/2010 | Mogensen et al. | |
| 2011/0093833 A1 | 4/2011 | Kierans et al. | |
| 2012/0110551 A1 | 5/2012 | Fink et al. | |
| 2012/0179508 A1 | 7/2012 | Sefland | |
| 2012/0317541 A1* | 12/2012 | Kaulgud | G06F 11/3604 717/102 |
| 2013/0152046 A1* | 6/2013 | Salecker | G06F 8/71 717/122 |
| 2013/0152047 A1 | 6/2013 | Moorthi et al. | |
| 2013/0311968 A1 | 11/2013 | Sharma Manoj | |
| 2014/0236660 A1 | 8/2014 | Cantor et al. | |
| 2014/0344775 A1 | 11/2014 | Dunne et al. | |
| 2014/0344776 A1 | 11/2014 | Dunne et al. | |
| 2015/0012852 A1 | 1/2015 | Borodin et al. | |
| 2015/0058675 A1 | 2/2015 | Kadishay | |
| 2015/0143327 A1 | 5/2015 | Holmes et al. | |
| 2015/0278751 A1 | 10/2015 | Sunder et al. | |
| 2015/0286470 A1 | 10/2015 | Dahan | |
| 2016/0055079 A1 | 2/2016 | Hanna | |
| 2017/0052831 A1* | 2/2017 | Wu | G06F 9/5083 |

OTHER PUBLICATIONS

Getting Started with Automated Build Studio 4, AutomatedQA Corporation, 2007, 192 pages, [retrieved on Jun. 8, 2017], Retrieved from the Internet: <URL:https://moonsoft.fi/materials/automatedqa_abs_getting_started.pdf>.*

Kou, H., Automated Inference of Software Development Behaviors: Design, Implementation and Validation of Zorro for Test-Driven Development, Dissertation, 2007, 207 pages, [retrieved on Oct. 3, 2017], Retrieved from the Internet: <URL:https://www.researchgate.net/publication/250270950>.*

Kuona—Build Analytics, Nov. 22, 2015, 5 pages, [retrieved on Oct. 3, 2017], Retrieved from the Internet: <URL:https://web.archive.org/web/20151122025033/https://kuona.github.io/>.*

Cook, J. E., et al., Automating Process Discovery through Event-Data Analysis, Proceedings of the 17th international conference on Software engineering, 1995, pp. 73-82, [retrieved on Oct. 3, 2017], Retrieved from the Internet: <URL:http://dl.acm.org/>.*

USPTO, Office Action for U.S. Appl. No. 14/662,518, dated Jul. 25, 2017.

USPTO, Final Office Action for U.S. Appl. No. 14/662,518, dated Jan. 17, 2018.

USPTO, Office Action for U.S. Appl. No. 14/662,518, dated Apr. 4, 2018.

USPTO, Final Office Action for U.S. Appl. No. 14/662,518, dated Oct. 18, 2018.

USPTO, Advisory Action for U.S. Appl. No. 14/662,518, dated Mar. 27, 2018.

* cited by examiner

VISUAL PRESENTATION OF METRICS REFLECTING LIFECYCLE EVENTS OF SOFTWARE ARTIFACTS

TECHNICAL FIELD

The present disclosure is generally related to distributed computer systems, and is more specifically related to systems and methods for visual presentation of metrics reflecting lifecycle events of software artifacts.

BACKGROUND

A distributed computer comprising one or more components, including, e.g., code repositories, development servers, test servers, database servers, and/or various other components, may be employed for software development. "Software development" herein shall reference various activities including design, development, and testing of software artifacts comprised by one or more software applications. "Software artifact" herein shall reference various modules, usually represented by files, such as source files, executable files, object files, data files, libraries, etc. that are necessary for building and/or running one or more software applications.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2C schematically illustrates an example of data presentation GUI employed by a distributed computer system for visual presentation of operational status of one or more critical functional points (CFPs), in accordance with one or more aspects of the present disclosure;

DETAILED DESCRIPTION

Described herein are methods and systems for visual presentation of metrics reflecting lifecycle events of software artifacts undergoing various software development activities. In an illustrative example, the lifecycle of a software application may comprise, among other events, building a plurality of executable modules using one or more codebases. "Codebase" herein shall refer to a collection of files (e.g., source files, data files, project files, build scripts, etc.) that are stored in a code repository and may be utilized to build one or more software applications that belong to a certain project. Lifecycle events of a software application may further comprise modifying one or more files of the respective codebase, building a new version, creating and upgrading one or more development, testing, and/or production environments, etc.

In certain implementations, an organization may employ multiple software development environments for developing multiple software applications utilizing a plurality of codebases. "Software development environment" herein shall refer to a distributed computer system including servers (such as hardware servers and/or virtual machines) and associated infrastructure elements (such as hardware and/or virtual infrastructure elements, e.g., networks, switches, routers, firewalls, and/or load balancers) that are utilized for development of one or more software applications. Multiple software development environments controlled by a single organization may be also considered as a distributed computer system.

In accordance with one or more aspects of the present disclosure, such a distributed computer system may employ one or more data visualization clients to visually present a plurality of real-time and/or aggregated metrics reflecting lifecycle events of software artifacts that are being developed within the software development environments. In various illustrative examples, a data visualization client may be provided by a desktop computer system or a mobile computer system (such as a smartphone, a tablet computer, or a notebook computer).

In certain implementations, a data visualization client receiving data feeds from one or more data collection and presentation servers may render one or more graphs that visually represent values of one or more metric reflecting certain lifecycle events of software artifacts. The metric values for graphical representation may be identified based on one or more user-configurable criteria, as described in more details herein below. In an illustrative example, the data visualization client may render one or more graphs showing the number of code changes for the corresponding codebase in a visual relationship to the time axis, for a certain number of codebases having the largest numbers of code changes among a plurality of codebases pertaining to an identified project, development environment or other logical grouping. In another illustrative example, the data visualization client may render one or more graphs showing the number of builds for the corresponding codebase in a visual relationship to the time axis, for a certain number of codebases having the largest numbers of builds among a plurality of codebases pertaining to an identified project, development environment or other logical grouping. The graphs may be updated in real time, e.g., with a certain frequency, and may be visually sliding over the time axis to the left, while graphically rendering the latest data near the right edge of the corresponding window.

In various illustrative examples, the data visualization client may further display certain numerical information, such as the number of currently active users, the number of builds within the last period, the total number of codebases, the total number of code changes within the last period, the number of users by project, the number of codebases by project, the total number of software artifacts managed, etc.

In various illustrative examples, the above described graphs and numerical information may be visually organized in one or more windows that may be displayed within a single screen simultaneously or within multiple screens that may be selectable by various graphical user interface (GUI) controls (such as buttons, menus, etc.).

As noted herein above, the data visualization clients may receive the data feeds from one or more data collection and presentation servers. Each data collection and presentation server may receive, via one or more networks, various data items reflecting lifecycle events of software artifacts that are being developed within the software development environments associated with the data collection and presentation servers. Such data items may be produced by data collection agents installed on the development environment servers and/or other infrastructure elements. Certain data items may be produced by data collection agents employed to perform active testing (e.g., by transmitting requests for ascertaining the status of a certain server or system component). Additional data items may be received from various devices configured to intercept network traffic (e.g., port mirroring devices or network traffic sniffers).

In an illustrative example, a data collection and presentation server may be configured with one or more data processing rules specifying the operations to be performed on one or more raw data items reflecting lifecycle events associated with one or more collections of software artifacts (e.g., codebases, projects, development environments, etc.). The data collection and presentation server apply the data processing rules to raw data items received from various data collection agents, in order to produce values of one or more metrics reflecting lifecycle events associated with the software artifact collections. The data collection server may then transmit, to one or more data visualization clients, one or more messages causing the data visualization client to graphically represent the metric values via the respective GUIs, as described in more details herein below.

In certain implementations, one or more data collection and presentation servers may be further configured to determine the real-time operational status of various development environments. In an illustrative example, the operational status of a development environment may be characterized as "available" responsive to determining that an average server response time does not exceed a first threshold value (e.g., the Service Level Agreement (SLA) performance). In another illustrative example, the operational status may be characterized as "maintenance window" responsive to receiving a maintenance window notification from a data collection agent. In another illustrative example, the operational status may be characterized as "unavailable" responsive to determining that one or more received data items indicate at least a certain number of failed attempts to perform a certain function (e.g., user login). In another illustrative example, the operational status may be characterized as "no data available" responsive to determining that no raw data items have been received from the development environment servers within a certain period of time. In various illustrative examples, the above described operational status information may be visually organized in one or more windows that may be displayed by one or more data visualization clients.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
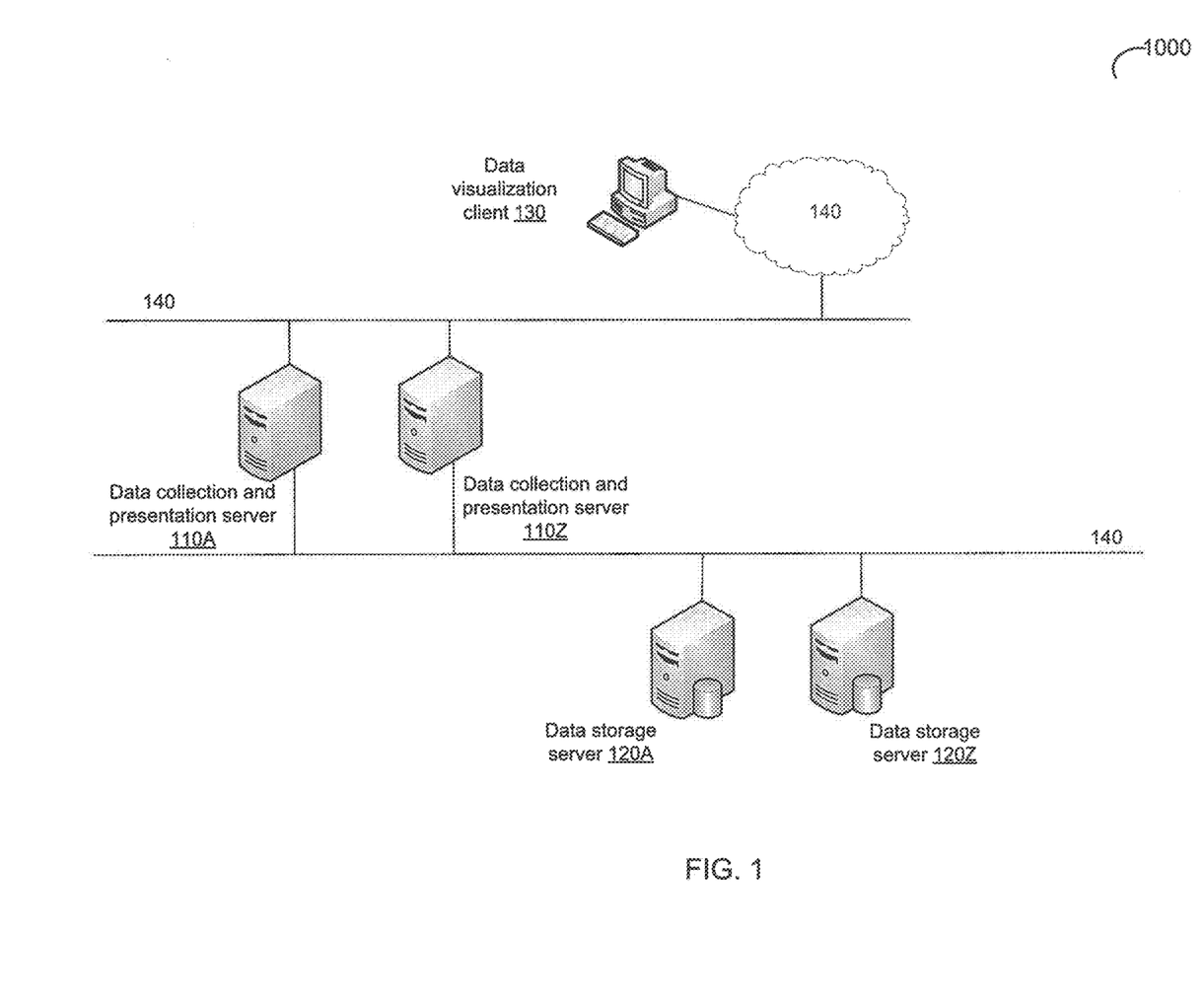
FIG. 1 schematically illustrates a high-level network diagram of an example distributed computer system that may implement the methods for visual presentation of metrics reflecting lifecycle events of software artifacts, in accordance with one or more aspects of the present disclosure.

FIG. 1 schematically illustrates a high-level network diagram of an example distributed computer system 1000, which may implement the methods for visual presentation of metrics reflecting lifecycle events of software artifacts in accordance with one or more aspects of the present disclosure. Computer systems, components, appliances, and network segments are shown in FIG. 1 for illustrative purposes only and do not in any way limit the scope of the present disclosure. Various other computer systems, components, appliances, network segments, and/or methods of their interconnection may be compatible with the methods and systems described herein for visual presentation of metrics reflecting lifecycle events of software artifacts.

Example distributed computer system 1000 may comprise one or more data collection and presentation servers 110A-110Z, which may be configured for implementing the methods for visual presentation of metrics reflecting lifecycle events of software artifacts in accordance with one or more aspects of the present disclosure. In certain implementations, distributed computer system 1000 may further comprise one or more data storage servers 120A-120Z, which may be configured to store various data items related to one or more software development environments. Data storage servers 120A-120Z may be provided by file or block-level storage, relational databases, and/or data storage devices or systems of various other types.

Example distributed computer system 1000 may further comprise one or more data visualization clients 130, which may be configured to receive values of one or more metrics reflecting certain lifecycle events of software artifacts, development environment operational status and/or other information from data collection and presentation servers 110A-110Z in order to present the data via a GUI, as described in more details herein below.

Data collection and presentation servers 110A-110Z, data visualization client 130, and other components of example distributed computer system 1000 may be interconnected by one or more networks 140, which may comprise one or more local area networks (LANs) and/or one or more wide area networks. Firewalls, load balancers, network switches and various other networking components may be omitted from FIG. 1 for clarity.

In certain implementations, one or more data collection and presentation servers 110A-110Z and/or other components of example distributed computer system 1000 may be communicatively coupled (e.g., via one or more networks) to one or more development environment servers (not shown in FIG. 1) in order to automatically collect environment monitoring data, as described in more details herein below.

The above described architecture of distributed computer system 1000 serves as an illustrative example only and does not in any way limit the scope of the present disclosure. Various other system architectures may be compatible with the methods and systems for determining software testing project status indicators in accordance with one or more aspects of the present disclosure.

In accordance with one or more aspects of the present disclosure, one or more data collection and presentation servers 110A-110Z may receive raw data items reflecting various lifecycle events of software artifacts that are being developed within one or more software development environments. In an illustrative example, a raw data item may specify the event type (e.g., code change event or build event), one or more event parameters (e.g., the name of the modified file, the build parameters, etc.), the codebase associated with the event, and the timestamp of the event.

In an illustrative example, the raw data items may be produced by one or more agents installed on the development environment servers and configured to transmit logging messages to data collection and presentation servers 110A-110Z. In certain implementations, the logging message transmission may occur over a dedicated connection to data collection and presentation server 110, in order to enable the real-time data collection and subsequent processing. A logging message may comprise one or more raw data items reflecting lifecycle events of one or more software artifacts (e.g., file modification event, codebase build event, etc.).

In another illustrative example, a plurality of raw data items may be produced by one or more active monitoring agents, which may be configured to periodically transmit certain probe messages to the development environment servers. The raw data produced by an active monitoring agent may comprise a copy of a probe message, a copy of a server response message, and/or values of certain aggregated metrics reflecting the service operational status and/or specific performance parameters of a particular development server (e.g., the average server response time, the average message roundtrip time, the number of errors within a certain period of time, etc.).

In another illustrative example, a plurality of raw data items may be produced by one or more network devices, such as data link layer switches and/or network layer routers, capable of performing port mirroring. In an illustrative example, data link layer port mirroring may involve sending, to data collection and presentation servers 110A-110Z and/or data storage server 120A-120Z, copies of network packets seen on one or more switch ports that are connected to the development environment servers.

In another illustrative example, a plurality of raw data items may be produced by one or more devices, such as network sniffers, capable of intercepting the network traffic. In an illustrative example, intercepting network traffic may involve sending a copy of intercepted network packets to data collection and presentation servers 110A-110Z and/or data storage servers 120A-120Z.

In certain implementations, in addition to or instead of the above described data collection methods, various other data collection methods may be implemented by distributed computer system 1000.

The data collection and presentation server may perform certain data processing operations involving the received data items, including aggregating two or more data items in view of one or more aggregation criteria, filtering a set of data items in view of one or more filtering criteria, calculating values of certain functions of one or more data items, etc. In certain implementations, the operations to be performed by a data collection and presentation server on the incoming raw data items may be determined by one or more data processing rules. A data processing rule may specify the event type (e.g., file modification event), the aggregation operation (e.g., identifying an average or a maximum value), the raw data item field containing the aggregation parameter (e.g., the codebase identifier), the filtering time range (e.g., last 60 minutes), etc.

The above described data processing rules serve as illustrative examples only and do not in any way limit the scope of the present disclosure. Various other data processing rules may be compatible with the methods and systems for visual presentation of metrics reflecting lifecycle events of software artifacts. In various illustrative examples, the above described and/or other data processing rules may be configured via a GUI and/or received via an administrative application programming interface (API) of one or more data collection and presentation servers 110A-110Z.

In an illustrative example, a data collection and presentation server may count the number of certain events (e.g., code changes or builds) for a certain period of time, select the codebases associated with the largest counter values and send, to a data visualization client, one or more messages comprising the aggregated data reflecting the number of events per codebase. In certain implementations, the messages may be transmitted by the data collection and presentations server with a pre-determined frequency. Alternatively, the messages may be transmitted responsive to detecting a certain event (e.g., new batch of data items has been received and processed).

Figure 2A:
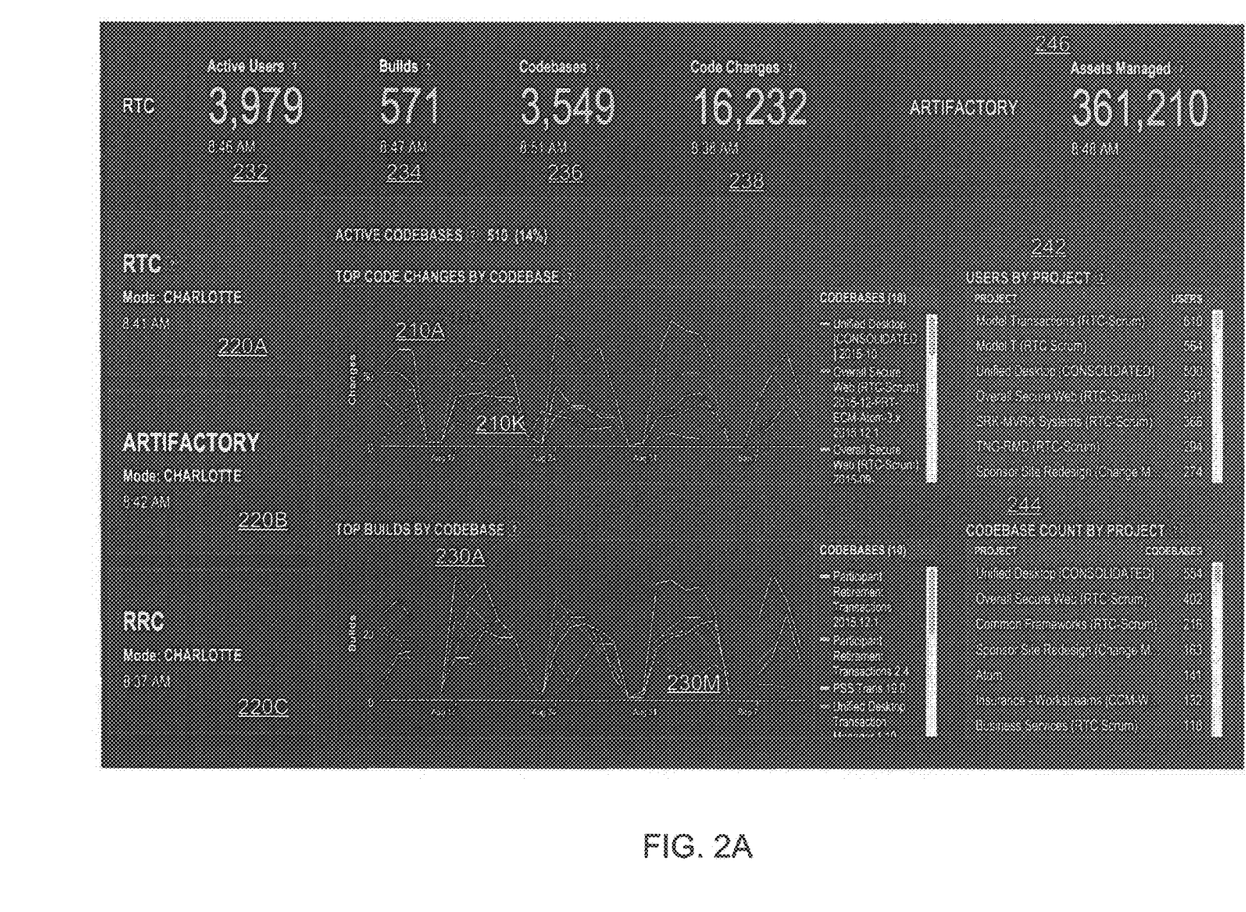
FIG. 2A schematically illustrates an example of data presentation GUI employed by a distributed computer system for visual presentation of metrics reflecting lifecycle events of software artifacts, in accordance with one or more aspects of the present disclosure.

Responsive to receiving the messages comprising the aggregated data reflecting the number of events per codebase, the data visualization client may display several graphs that visually represent values of one or more metrics reflecting certain lifecycle events of software artifacts. FIG. 2A schematically illustrates an example of data presentation GUI employed by distributed computer system 1000 for visual presentation of metrics reflecting lifecycle events of software artifacts, in accordance with one or more aspects of the present disclosure.

As schematically illustrated by FIG. 2A, the data visualization client may display one or more graphs 210A-210K showing the number of code changes for the corresponding codebase in a visual relationship to the time axis, for a certain number of codebases having the largest numbers of code changes among a plurality of codebases pertaining to a logical grouping (e.g., a project, a tool, or a development environment). In the illustrative example of FIG. 2A, the logical grouping may be identified by selecting one of the fields 220A-220C. Graphs 210A-210K may be updated in real time, e.g., with a certain frequency, and may be visually sliding over the time axis to the left, while graphically rendering the latest data near the right edge of the corresponding window. The data visualization client may assign a distinctive color to each of the graphs 210A-210K and display a color code legend showing the codebase symbolic names and the corresponding graph colors.

The data visualization client may also display one or more graphs 230A-230M showing the number of builds for the corresponding codebase in a visual relationship to the time axis, for a certain number of codebases having the largest numbers of builds among a plurality of codebases pertaining to a logical grouping (e.g., a project, a tool, or a development environment). Graphs 230A-230M may be updated in real time, e.g., with a certain frequency, and may be visually sliding over the time axis to the left, while graphically rendering the latest data near the right edge of the corresponding window.

The data visualization client may assign a distinctive color to each of the graphs 230A-230M and display a color code legend showing the codebase symbolic names and the corresponding graph colors.

In various illustrative examples, the data visualization client may further display certain numerical information, such as the number of currently active users 232, the number of builds within the last period 234, the total number of codebases 236, the total number of code changes within the last period 238, the number of users by project 242, the number of codebases by project 244, the total number of software artifacts managed 246, etc.

In various illustrative examples, the above described graphs and numerical information may be visually organized in one or more windows that may be displayed within a single screen simultaneously or within multiple screens that may be selectable by various GUI controls (such as buttons, menus, etc.).

In certain implementations, a data collection and presentation server may be configured to receive one or more operational status determination rules for determining an operational status of a development environment based on one or more data items received from the data collection agents. In certain implementations, an operational status determination rule may be represented by a conditional statement including one or more logical conditions and at least one value of the application operational status corresponding to a certain result (e.g., true or false) of evaluating the logical conditions. A logical condition may comprise one or more monitoring data item values and/or one or more pre-defined and/or dynamically calculated (i.e., at run-time) threshold values, against which the monitoring data item values are compared by one or more arithmetical or logical operations.

A data collection and presentation server may determine the operational status of one or more development environments in real time and cause the operational status to be displayed by one or more data visualization clients. In certain implementations, data collection and presentation server 110 may, in accordance with an example operational status determination rule, responsive to determining that an average server response time does not exceed a pre-defined or dynamically calculated threshold value (e.g., the SLA performance), characterize the operational status of the respective development environment as "available."

In certain implementations, data collection and presentation server 110 may, in accordance with another example operational status determination rule, responsive to receiving a maintenance window notification from a data collection agent, characterize the application operational status as "maintenance window."

In certain implementations, data collection and presentation server 110 may, in accordance with another example operational status determination rule, responsive to determining that no raw data items have been received for the development environment servers within a certain period of time, characterize the application operational status as "no data available."

In certain implementations, data collection and presentation server 110 may, in accordance with another example operational status determination rule, responsive to determining that one or more raw data items indicate at least a certain number of failed attempts to perform a certain function (e.g., user login), characterize the application operational status as "unavailable."

The above described operational status determination rules serve as illustrative examples only and do not in any way limit the scope of the present disclosure. Various other operational status determination rules may be compatible with the methods and systems for visual presentation of metrics reflecting lifecycle events of software artifacts. In various illustrative examples, the above described and/or other operational status determination rules may be configured via a GUI and/or received via an administrative application programming interface (API) of one or more data collection and presentation servers 110A-110Z.

A data collection and presentation server may apply one or more status determination rules to a plurality of data items received from one or more data collection agents to determine the operational status of one or more development environments in real time and cause the operational status to be displayed by one or more data visualization clients by transmitting, to the data visualization clients, one or more messages comprising the operational status information. In certain implementations, the messages may be transmitted by the data collection and presentations server with a pre-determined frequency. Alternatively, the messages may be transmitted responsive to detecting a certain event (e.g., change of the operational status of at least one software development environment).

Figure 2B:
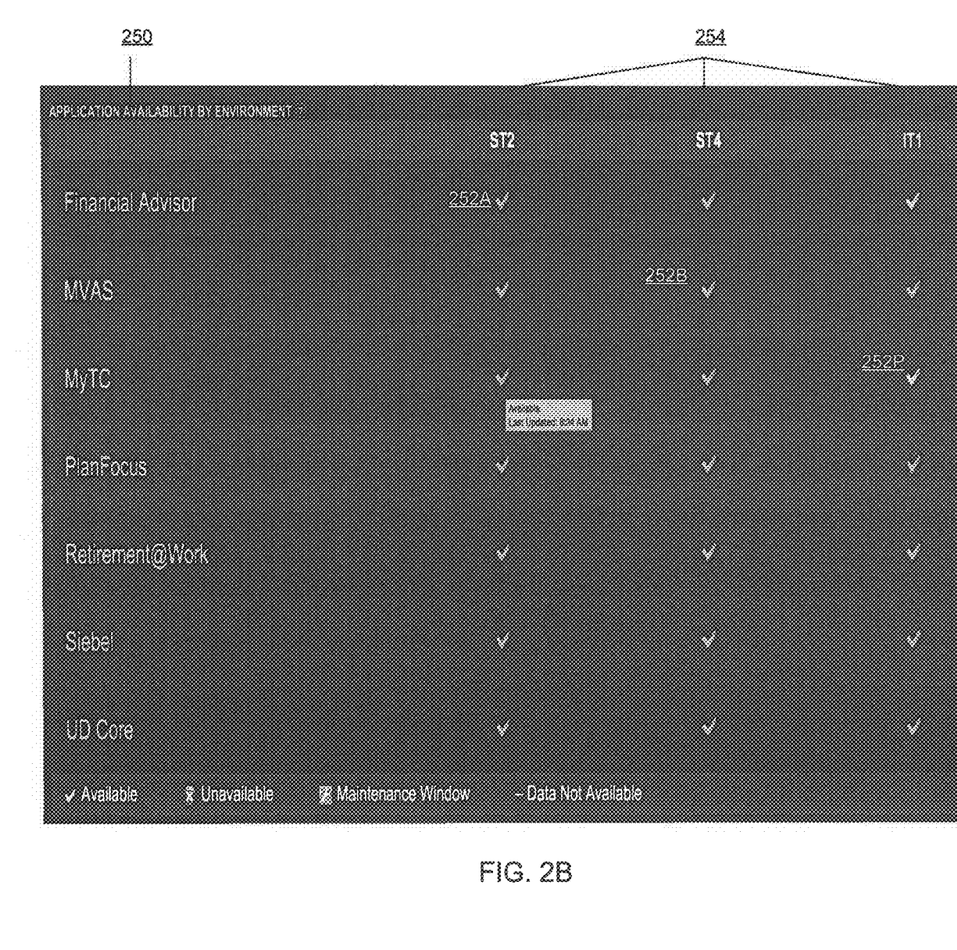
FIG. 2B schematically illustrates an example of data presentation GUI employed by a distributed computer system for visual presentation of operational status of one or more software development environments, as defined herein below, in accordance with one or more aspects of the present disclosure.

Responsive to receiving the messages comprising the operational status information, the data visualization client may display several graphs that visually represent values of one or more metrics reflecting certain lifecycle events of software artifacts. FIG. 2B schematically illustrates an example of data presentation GUI employed by distributed computer system 1000 for visual presentation of operational status of one or more software development environments, in accordance with one or more aspects of the present disclosure.

As schematically illustrated by FIG. 2B, the data visualization client may display a list of software applications 250. For each software application, the data visualization client may display a plurality of operational status indicators 252A-252P corresponding to each of software development environments 254. Operational status indicators 252A-252P may use different images, symbols, colors, greyscale steps, and/or shapes for representing various operational status values (e.g., "available," "unavailable," "maintenance window," or "no data available").

In certain implementations, responsive to receiving a user interface command selecting an application from a list of software applications 250, the data visualization client may present a "drill-down" information window reflecting various data for critical functional points (CFPs) of the selected application. "CFP" herein shall refer to an arbitrarily designated functional point, the performance of which may be tested independently of other functional points, e.g., by inspecting the response to a request (e.g., a probe request or a client-initiated request) addressed to the CFP. FIG. 2C schematically illustrates an example of data presentation GUI employed by distributed computer system 1000 for visual presentation of operational status of one or more CFPs, in accordance with one or more aspects of the present disclosure.

As schematically illustrated by FIG. 2C, the data visualization client may display a list of CFPs 260 associated with the selected application. For each CFP, the data visualization client may display the SLA response time 262 and one or more values of average measured response times 264 within a certain timeframe (e.g., within the last 30 minutes, within the last hour, and within the current day). In certain implementations, the data visualization client may further display a graph 266 representing the average measured response times. In certain implementations, the data visualization client may further display one or more counters 268 of critical errors within a certain timeframe (e.g., within the last 30 minutes, within the last hour, and within the current day).

The above described data presentation screens serve as illustrative examples only and do not in any way limit the scope of the present disclosure. Various other data presentation screens may be compatible with the methods and systems for visual presentation of metrics reflecting lifecycle events of software artifacts.

Figure 3:
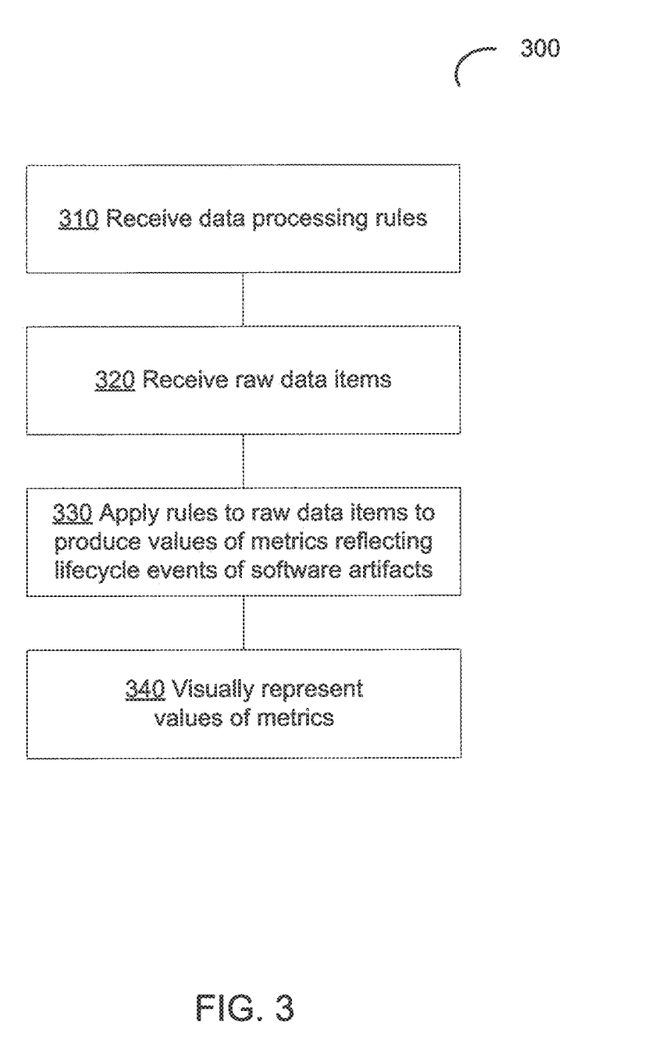
FIG. 3 depicts a flow diagram of an example method for visual presentation of metrics reflecting lifecycle events of software artifacts, in accordance with one or more aspects of the present disclosure.

FIG. 3 depicts a flow diagram of an example method 300 for visual presentation of metrics reflecting lifecycle events of software artifacts, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, the processing device implementing the method may receive, via a communication interface, one or more data processing rules. In certain implementations, a data processing rule may specify the event type (e.g., file modification event), the aggregation operation (e.g., identifying an average or a maximum value), the raw data item field containing the aggregation parameter (e.g., the codebase identifier), the filtering time range (e.g., last 60 minutes), etc.

At block 320, the processing device may receive, from one or more data collection agents, a plurality of raw data items reflecting lifecycle events associated with one or more software artifacts. Lifecycle events may comprise modification events of certain software artifacts or codebase build events involving certain software artifacts, as described in more details herein above.

At block 330, the processing device may apply the data processing rules to the plurality of raw data items in order to produce a plurality of values of one or more metrics reflecting lifecycle events associated with one or more collections of software artifacts. A collection of software artifacts may be associated with a software project or a software codebase, as described in more details herein above.

At block 340, the processing device may cause the operational status to be visually represented via a graphical user interface (GUI), as described in more details herein above with references to FIGS. 2A-2B.

Figure 4:
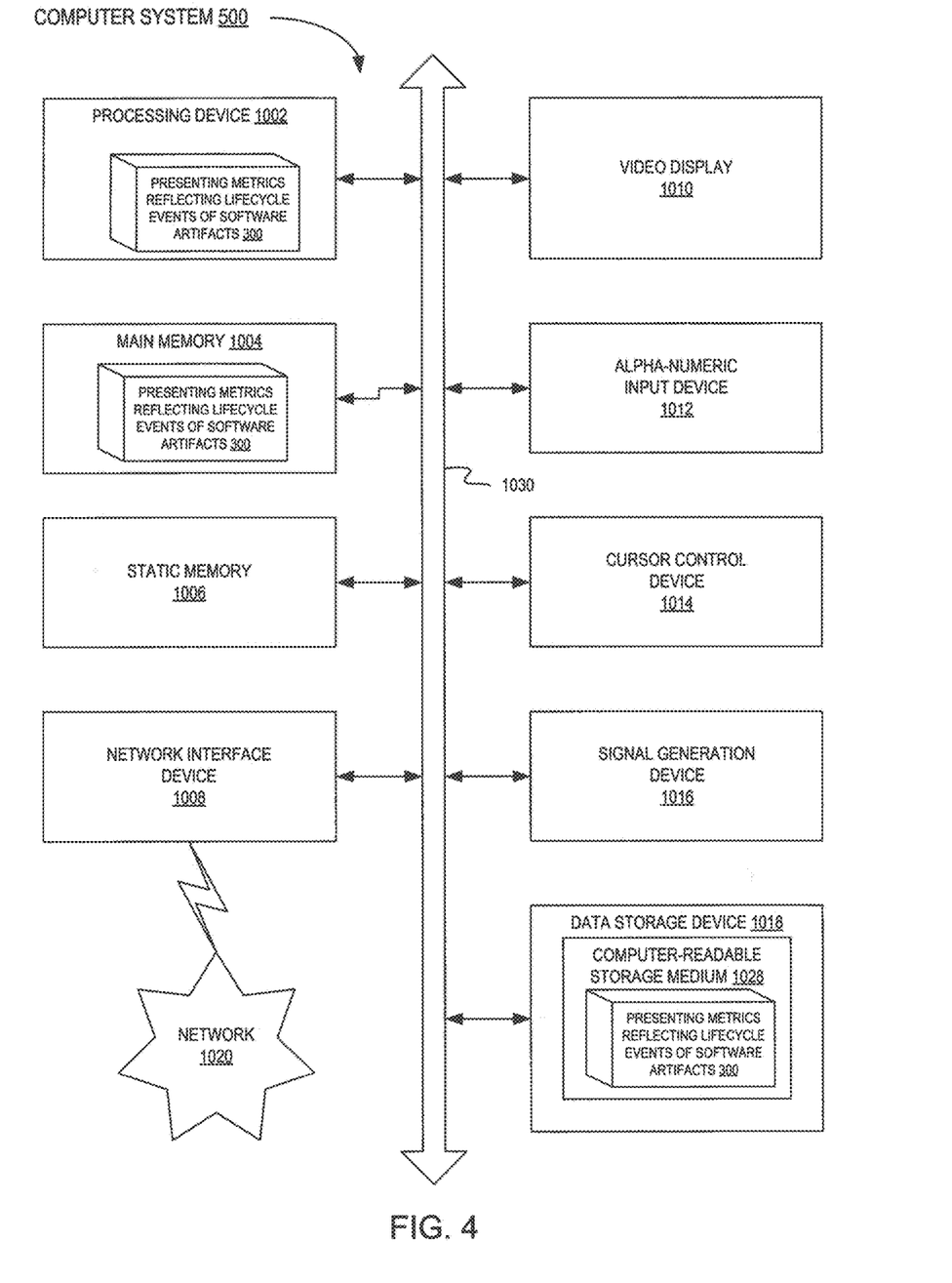
FIG. 4 depicts a block diagram of an example computer system operating in accordance with one or more aspects of the present disclosure.

FIG. 4 depicts a block diagram of an example computer system 500 operating in accordance with one or more aspects of the present disclosure. Computer system 500 may execute a set of instructions causing the computer system to perform the methods discussed herein. The computer system 500 may be connected to other computer systems in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computer system is illustrated, the term "computer system" shall also be taken to include any collection of computer systems that individually or jointly execute a set (or multiple sets) of instructions to perform the methods discussed herein. In illustrative examples, the computer system 500 may implement the above described method 300 for visual presentation of metrics reflecting lifecycle events of software artifacts.

The example computer system 500 may include a processing device (e.g., a general purpose processor) 1002, a main memory 1004 (e.g., synchronous dynamic random access memory (DRAM), read-only memory (ROM), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the method 300 for visual presentation of metrics reflecting lifecycle events of software artifacts, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for visual presentation of metrics reflecting lifecycle events of software artifacts, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computer systems that manipulate and transform data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by a processing device, a data processing rule specifying an aggregation operation to be performed on raw data items reflecting lifecycle events associated with a software artifact, the data processing rule further specifying an event type, an event aggregation parameter and an event filtering time range, wherein the event aggregation parameter is provided by an identifier of a code base associated with the software artifact;
    receiving, from one or more data collection agents, a plurality of raw data items;
    selecting, from the plurality of raw data items, one or more raw data items comprising the specified event aggregation parameter and specifying lifecycle events of the specified event type falling within the event filtering time range;
    producing, by applying the data processing rule to the selected raw data items, a plurality of values of a metric reflecting lifecycle events associated with the software artifact; and
    causing the values to be graphically represented using a graphical user interface (GUI).

2. The method of claim 1, wherein the data collection agents are associated with at least one of: a software development environment or a software code repository.

3. The method of claim 1, wherein the metric represents a count of software artifact lifecycle events of the specified event type.

4. The method of claim 1, wherein the lifecycle event is represented by one of: a modification of the software artifact or a codebase build involving the software artifact.

5. The method of claim 1, wherein the software artifact is associated with at least one logical group provided by at least one of: a software project or a software code base.

6. The method of claim 1, wherein causing the values to be graphically represented comprises causing the values to be graphically represented in a visual relationship to a time axis.

7. The method of claim 1, wherein causing the values to be graphically represented comprises causing a graph to be rendered using the graphical user interface, the graph reflecting a number of code changes for a chosen codebase having largest numbers of code changes among a plurality of codebases pertaining to a logical group, in a visual relationship to a time axis.

8. The method of claim 1, wherein causing the values to be graphically represented comprises causing a graph to be rendered using the graphical user interface, the graph reflecting a number of builds for a chosen codebase having largest numbers of builds among a plurality of codebases pertaining to a logical group, in a visual relationship to a time axis.

9. The method of claim 1 wherein at least one data collection agent is configured to perform active server testing.

10. The method of claim 1 wherein at least one data collection agent is configured to perform monitoring of network traffic.

11. A system comprising:
    a memory; and
    a processing device, coupled to the memory, wherein the processing device is configured to:
        receive a data processing rule specifying an aggregation operation to be performed on raw data items reflecting lifecycle events associated with a software artifact, the data processing rule further specifying an event type, an event aggregation parameter and an event filtering time range, wherein the event aggregation parameter is provided by an identifier of a code base associated with the software artifact;
        receive, from one or more data collection agents, a plurality of raw data items;
        select, from the plurality of raw data items, one or more raw data items comprising the specified event aggregation parameter and specifying lifecycle events of the specified event type falling within the event filtering time range;
        produce, by applying the data processing rule to the selected raw data items, a plurality of values of a metric reflecting lifecycle events associated with the software artifact; and
        cause the values to be graphically represented using a graphical user interface (GUI).

12. The system of claim 11, wherein the data collection agents are associated with at least one of: a software development environment or a software code repository.

13. The system of claim 11, wherein the metric represents a count of software artifact lifecycle events of a certain type.

14. The system of claim 11, wherein the lifecycle event is represented by one of: a modification of the software artifact or a codebase build involving the software artifact.

15. The system of claim 11, wherein causing the values to be graphically represented comprises causing the values to be graphically represented in a visual relationship to a time axis.

16. The system of claim 11, wherein causing the values to be graphically represented comprises causing a graph to be rendered using the graphical user interface, the graph reflecting a number of code changes for a chosen codebase having largest numbers of code changes among a plurality of codebases pertaining to a logical group, in a visual relationship to a time axis.

17. The system of claim 11, wherein causing the values to be graphically represented comprises causing a graph to be rendered using the graphical user interface, the graph reflecting a number of builds for a chosen codebase having largest numbers of builds among a plurality of codebases pertaining to a logical group, in a visual relationship to a time axis.

18. A computer-readable non-transitory storage medium comprising executable instructions that, when executed by a first computer system, cause the computer system to perform operations comprising:

receiving a data processing rule specifying an aggregation operation to be performed on raw data items reflecting lifecycle events associated with a software artifact, the data processing rule further specifying an event type, an event aggregation parameter and an event filtering time range, wherein the event aggregation parameter is provided by an identifier of a code base associated with the software artifact;

receiving, from one or more data collection agents, a plurality of raw data items;

selecting, from the plurality of raw data items, one or more raw data items comprising the specified event aggregation parameter and specifying lifecycle events of the specified event type falling within the event filtering time range;

producing, by applying the data processing rule to the selected raw data items, a plurality of values of a metric reflecting lifecycle events associated with the software artifact; and causing the values to be graphically represented using a graphical user interface (GUI).

19. The computer-readable non-transitory storage medium of claim 18, wherein causing the values to be graphically represented comprises causing a graph to be rendered using the graphical user interface, the graph reflecting a number of code changes for a chosen codebase having largest numbers of code changes among a plurality of codebases pertaining to a logical group, in a visual relationship to a time axis.

20. The computer-readable non-transitory storage medium of claim 18, wherein causing the values to be graphically represented comprises causing a graph to be rendered using the graphical user interface, the graph reflecting a number of builds for a chosen codebase having largest numbers of builds among a plurality of codebases pertaining to a logical group, in a visual relationship to a time axis.

* * * * *